US011895177B2

United States Patent
Akella et al.

(10) Patent No.: US 11,895,177 B2
(45) Date of Patent: Feb. 6, 2024

(54) STATE EXTRACTOR FOR MIDDLEBOX MANAGEMENT SYSTEM

(71) Applicant: Wisconsin Alumni Research Foundation, Madison, WI (US)

(72) Inventors: Srinivasa Aditya Akella, Middleton, WI (US); Junaid Khalid, Madison, WI (US); Aaron Robert Gember-Jacobson, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 534 days.

(21) Appl. No.: 15/282,130

(22) Filed: Sep. 30, 2016

(65) Prior Publication Data
US 2018/0095773 A1 Apr. 5, 2018

(51) Int. Cl.
*H04L 67/01* (2022.01)
*H04L 67/14* (2022.01)

(52) U.S. Cl.
CPC ............. *H04L 67/01* (2022.05); *H04L 67/14* (2013.01)

(58) Field of Classification Search
CPC .... G06F 9/5083; H04L 43/026; H04L 47/621
See application file for complete search history.

(56) References Cited

U.S. PATENT DOCUMENTS

| | | | |
|---|---|---|---|
| 8,095,668 B2 | 1/2012 | Mitchell et al. | |
| 8,155,116 B2 | 4/2012 | Eriksson et al. | |
| 8,468,259 B2 | 6/2013 | Mitchell et al. | |
| 8,489,751 B2 | 7/2013 | Mitchell et al. | |
| 8,621,058 B2* | 12/2013 | Eswaran | G06F 9/5072 709/223 |
| 8,762,501 B2 | 6/2014 | Kempf et al. | |
| 8,891,520 B2 | 11/2014 | Alicherry et al. | |
| 8,923,294 B2 | 12/2014 | Chao et al. | |
| 8,958,298 B2 | 2/2015 | Zhang et al. | |
| 9,104,492 B2 | 8/2015 | Gember et al. | |
| 2010/0115606 A1 | 5/2010 | Samovskiy et al. | |
| 2011/0173692 A1* | 7/2011 | Liu | H04L 63/101 726/13 |
| 2013/0003735 A1 | 1/2013 | Chao et al. | |
| 2013/0013664 A1 | 1/2013 | Baird et al. | |
| 2013/0125120 A1* | 5/2013 | Zhang | H04L 41/0823 718/1 |

(Continued)

OTHER PUBLICATIONS

Gember, Aaron, et al. "Toward software-defined middlebox networking." Oct. 2012. Proceedings of the 11th ACM Workshop on Hot Topics in Networks. ACM. (Year: 2012).*

(Continued)

*Primary Examiner* — Kenneth Tang
(74) *Attorney, Agent, or Firm* — Boyle Fredrickson SC

(57) ABSTRACT

A method of automatically identifying state information in different middlebox programs first identifies relevant program portions by expanding outward from a packet processing loop to statements dependent either by control or data dependency on that packet processing loop. Persistent variables in the statements are then collected and optionally winnowed by whether they are "used" or modified by those statements. The identified state variables may be segregated according to flow-spaces and/or output function so that a request for state data may be tailored precisely to the necessary state data greatly reducing network burden in state data transfer.

12 Claims, 3 Drawing Sheets

(56) References Cited

U.S. PATENT DOCUMENTS

| | | | |
|---|---|---|---|
| 2013/0223234 A1* | 8/2013 | Fuhs | G06F 9/5083 370/242 |
| 2013/0332983 A1 | 12/2013 | Koorevaar et al. | |
| 2014/0007088 A1 | 1/2014 | Jamjoom et al. | |
| 2014/0007094 A1 | 1/2014 | Jamjoom et al. | |
| 2015/0006714 A1* | 1/2015 | Jain | H04L 43/026 709/224 |
| 2015/0180715 A1* | 6/2015 | Ozawa | H04L 41/0803 709/221 |
| 2015/0180769 A1* | 6/2015 | Wang | H04L 45/38 370/236 |
| 2016/0149788 A1* | 5/2016 | Zhang | H04L 43/10 709/224 |
| 2016/0191384 A1* | 6/2016 | Shelar | H04L 45/742 370/392 |
| 2017/0026301 A1* | 1/2017 | Keller | H04L 47/621 |
| 2017/0353373 A1* | 12/2017 | Agarwal | H04L 63/1408 |

OTHER PUBLICATIONS

Joseph, Dilip A., et al., A Policy-aware Switching Layer for Data Centers, SIGCOMM '08, Aug. 17-22, 2008, pp. 51-62. Seattle, Washington.

Benson, Theophilus, et al., CloudNaaS: A Cloud Networking Platform for Enterprise Applications, SOCG '11, Oct. 27-28, 2011. Cascais, Portugal.

Benson, Theophilus, et al., EPIC; Platoform-as-a-Service Model for Cloud Networking, Computer Sciences Department, University of Wisconsin Madison, Technical Report #1686, pp. 1-14, Feb. 2011.

Meng, Xiaoqiao, et al., Improving the Scalability of Data Center Networks with Traffic-aware Virtual Machine Placement, Presented by Peter Izsak (236635) on the Management and Efficiency of Cloud Based Services, pp. 1-39, Dec. 8, 2010.

Benson, Theophilus, et al., Stratos; Virtual Middleboxes as First-Class Entities, CS Technical Reports, Citation TR1771, pp. 1-2, University of Wisconsin—Madison Department of Computer Sciences, Jun. 18, 2012.

* cited by examiner

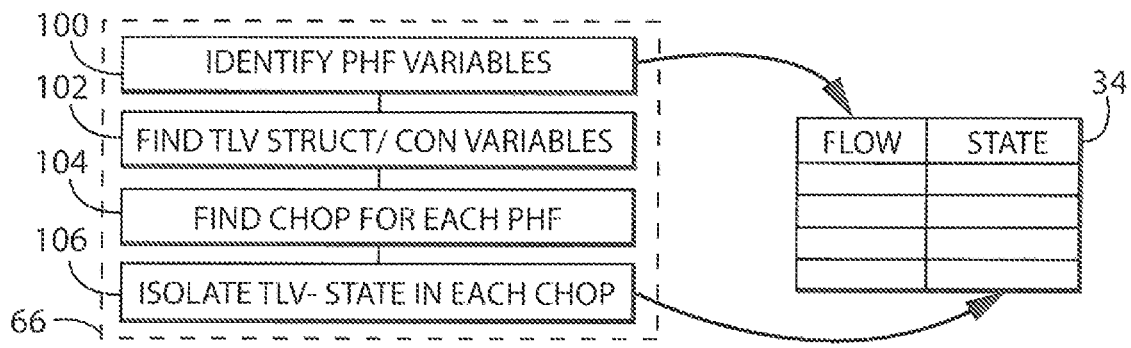
FIG. 6
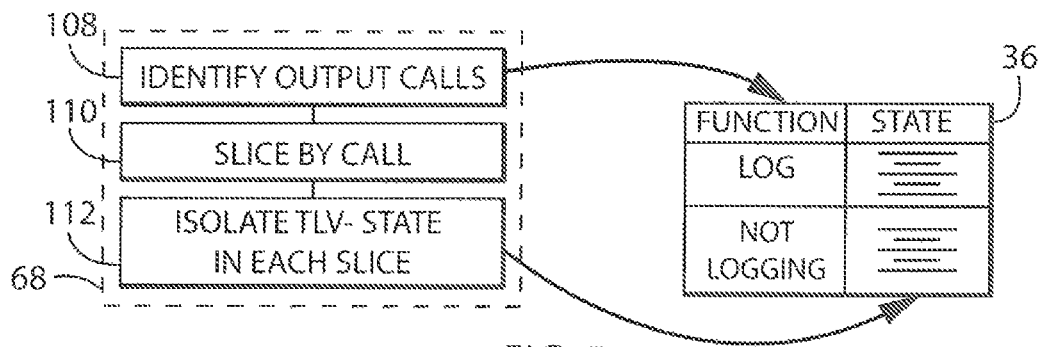
FIG. 7
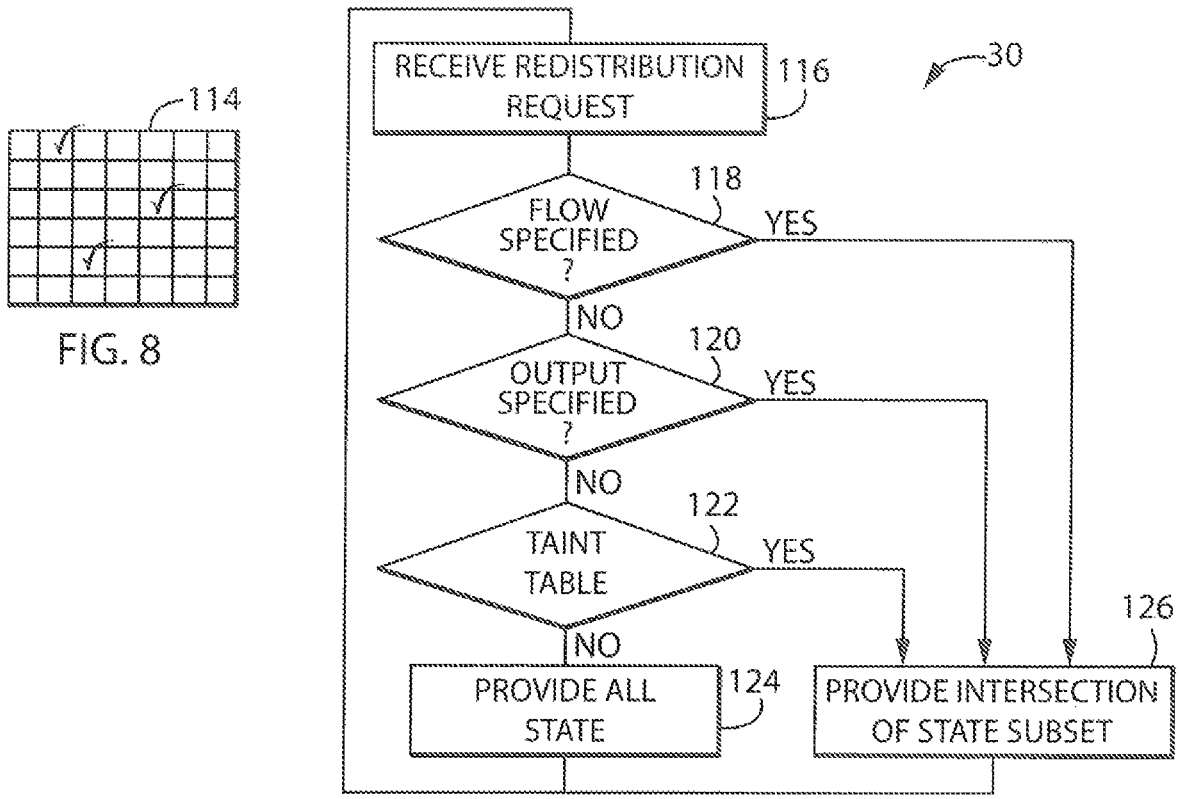
FIG. 8
FIG. 9

STATE EXTRACTOR FOR MIDDLEBOX MANAGEMENT SYSTEM

STATEMENT REGARDING FEDERALLY SPONSORED RESEARCH OR DEVELOPMENT

This invention was made with government support under CNS1330308 and CNS1302041 awarded by the National Science Foundation. The government has certain rights in the invention.

CROSS REFERENCE TO RELATED APPLICATION

--

BACKGROUND OF THE INVENTION

The present invention relates to cloud-based computing, in which computer resources are provided in a scalable fashion as virtual machines executing on an array of computers, and in particular to a method of implementing "middlebox" functionality in such cloud-based systems with flexible scaling in a manner consistent with cloud-based computing.

"Middleboxes" are important components of large computer installations and service provider networks having multiple computers executing applications such as Web servers, application servers, file servers or databases or the like (enterprises). In this environment, middleboxes provide network related functions such as protecting the network and its applications from attacks (e.g., intrusion detection systems (IDS) and firewalls) and enhancing network efficiency (e.g., load balancers, WAN optimizers, and the like).

Most simply, middleboxes may be directly wired in the path of data to the enterprise computers with which they are associated. Middleboxes may be similarly installed by programming network switches used to control interconnections on the network joining the middleboxes and application computers.

Cloud computing provides a computer system architecture in which computing resources are provided on-demand in the form of virtual and/or actual machines that are flexibly allocated to multiple users as demand requires. A cloud application manages the machines so that users of the cloud can acquire additional machines at periods of high demand and return those machines when the demand drops. By aggregating many users, significant economy of scale may be realized in terms of maintenance of the hardware, provision of physical resources such as power and cooling, and smoothing of peak demands.

It is known how to implement middlebox functions on virtual machines in a cloud computing system. Unlike the scaling of other processes, however, it can be difficult to scale middlebox functions in a way that satisfies performance standards ("service level agreements") and minimizes operating costs without adversely affecting the accuracy of the middlebox functions.

U.S. Pat. No. 9,104,492 entitled "Cloud-Based Middlebox Management System.", assigned to the assignee of the present application and hereby incorporated by reference, describes a method for automatic scaling of middlebox functionality in the environment of cloud computing. In this system, virtual middlebox functions are transferred, created or destroyed (collectively termed redistribution) and traffic is redistributed among the virtual middlebox functions, so that the processing of packets is substantially uninterrupted, meaning that the output provided by the middleboxes immediately after the redistribution is equivalent to the output that would have occurred if the redistribution had not occurred, This is possible by a buffering system capturing incoming packets during the redistribution and a system of transferring state information between middleboxes that allows uninterrupted operation. The state information transferred from the middlebox reflects a history of processing of earlier packets such as can affect current packets.

SUMMARY OF THE INVENTION

The previously described scaling system requires that each middlebox be able to output, on command, state information that captures the knowledge obtained by the middlebox from previous packet processing. This feature is not available natively in most middlebox programs and must be created after the fact, for example, by manual inspection of the middlebox programs. This process can be laborious and require sophisticated understanding of the middlebox program and the possibly proprietary operation of each middlebox program. The problem of making state output available for a set of diverse middlebox programs, desirable in a cloud computing architecture, is a significant obstacle in providing cloud architecture with scalable middlebox functions.

The present invention provides a computer program that can extract state information from a wide range of different middlebox programs with little or no programmer input or without a detailed understanding of the middlebox program. The invention exploits the insight that state information can be identified as variables that persist outside of a standard packet processing "loop" and identifies strategies for automatically identifying these variables which are then further winnowed into a compact set suitable for real-time transmission through the cloud architecture. In this latter regard, state variables may be associated with particular flow-spaces so that a request for state indicating a flow-space may require only the transmission of the value of a subset of state variables necessary for that flow-space. Similarly state variables may be associated with particular middlebox functions (for example, logging or packet output and these functions may be identified in a request for state so that only the value of state variables associated with this function need to be transmitted. By providing a compact set of state variables, real-time monitoring of the modification of the state variables since the last state transfer can be performed further reducing the transmission burden on the network particularly when a middlebox is operated in a backup capacity.

More specifically, the invention provides, in one embodiment, a method of extracting state variables from a middlebox program in a cloud computing architecture by executing a program on electronic computer to: (a) receive a middlebox program; and (b) identify in the middlebox program a set of top-level variables including state variables by selecting variables persistent after a packet processing loop, the packet processing loop executing for each packet received by the middlebox program and where these top-level variables are modified by a first execution of the packet processing loop receiving a first packet and persistent during a second subsequent execution of the packet processing loop receiving a second packet. The program then (c) generates a program portion that interacts with the middlebox program to provide the top-level variables in response to a request to the middlebox program for state data during use of the given middlebox program in a cloud computing architecture.

It is thus a feature of at least one embodiment of the invention to provide an improved method of modifying a variety of different middlebox programs to permit automatic redistribution of network traffic in a manner consistent with reallocation of execution resources underlying cloud computing architectures. The system allows rapid identification of state variables with reduced effort and without the need for detailed understanding of the middlebox program.

Step (b) may identify the top-level variables by identifying control-flow-linked statements called directly or indirectly by the packet processing loop.

It is thus a feature of at least one embodiment of the invention to isolate a portion of the program likely to hold persistent state variables modified by a given packet processing.

Step (b) may further refine top-level variables by identifying data-dependency-linked statements having a data dependency with variables of the control-flow-linked statements.

It is thus a feature of at least one embodiment of the invention to capture statements that may generate state without direct control flow connection, for example, working with data that has been enqueued by control flow statements thus creating a data dependency without control flow dependency.

The data-dependency-linked statements may include those statements having a data dependency with an alias of variables of the control-flow-linked statements.

It is thus a feature of at least one embodiment of the invention to capture cases where a value has multiple names.

Step (b) may select top-level variables from static and global variables accessed by the data-dependency-linked statements and control-flow-linked statements.

It is thus a feature of at least one embodiment of the invention to quickly identify variables that can be persistent to hold state data between packets.

Step (b) may select as the top-level variables data-dependency-linked variables and control-flow-linked variables only if they are subject to modification by statements.

It is thus a feature of at least one embodiment of the invention to substantially reduce the amount of data that needs to be transmitted as state data by removing persistent variables that are not modified.

The method may further identify top-level variables to include loop-procedure variables used by statements within a packet processing procedure holding the packet processing loop and configuring and initializing the packet processing loop.

It is thus a feature of at least one embodiment of the invention to include some local variables preceding the packet processing procedure that can represent persistent state.

The packet processing loop may be identified using a standard library name of a library providing a packet processing loop.

It is thus a feature of at least one embodiment of the invention to leverage the use of standard libraries in identifying a packet processing loop (and hence state variables) cross a wide variety of different middlebox types and architectures.

The method may further associate the top-level variables with a flow-space, the flow-space being a parameter of packets received by the packet processing loop and step (c) may generate program elements interacting with the middlebox program to provide the top-level variables, in response to the request to the middlebox program for state data of a given flow-space during use of the middlebox program in a cloud computing architecture, for top-level variables associated with the given flow-space.

It is thus a feature of at least one embodiment of the invention to permit state to be linked to flow-space so that only a subset of state needs to be transmitted in certain instances of middlebox redistribution greatly reducing the time and burden on the cloud architecture network in such redistribution.

The step of associating the top-level variables with a flow-space may identify flow-space related statements associated with variables holding parameters of packets defining a flow-space and partition the top-level variables according to variables used by the flow-space related statements.

It is thus a feature of at least one embodiment of the invention to provide an automatic method of associating state to different flow-space through the partitioning of statements according to their association with standard variables denoting flow-space such as those denoting packet source address, packet destination address, packet source port, and packet destination port.

The method may further include the step of partitioning the top-level variables according to an output of the middlebox; and wherein step (c) generates program elements interacting with the middlebox program to provide the top-level variables, in response to the request to the middlebox program for state data of a middlebox function during use of the middlebox program in a cloud computing architecture, for top-level variables associated with the middlebox function.

It is thus a feature of at least one embodiment of the invention to provide even more winnowing of state data in the case where only selected middlebox functions are required, for example, packet control without logging.

These particular objects and advantages may apply to only some embodiments falling within the claims and thus do not define the scope of the invention.

BRIEF DESCRIPTION OF THE FIGURES

FIG. 6 is a detailed flowchart showing the third step of FIG. 3 in generation of a flow-space table used by the middleboxes during operation;

FIG. 7 is a detailed flowchart of the fourth step of FIG. 3 showing the generation of a middlebox function table used by middleboxes during operation;

FIG. 8 is a diagrammatic representation of a taint table that may be used by the middleboxes according to the present invention: and FIG. 9 is a flowchart showing the operation of a modification of the middlebox in responding to a state request.

DETAILED DESCRIPTION OF THE PREFERRED EMBODIMENT

Figure 1:
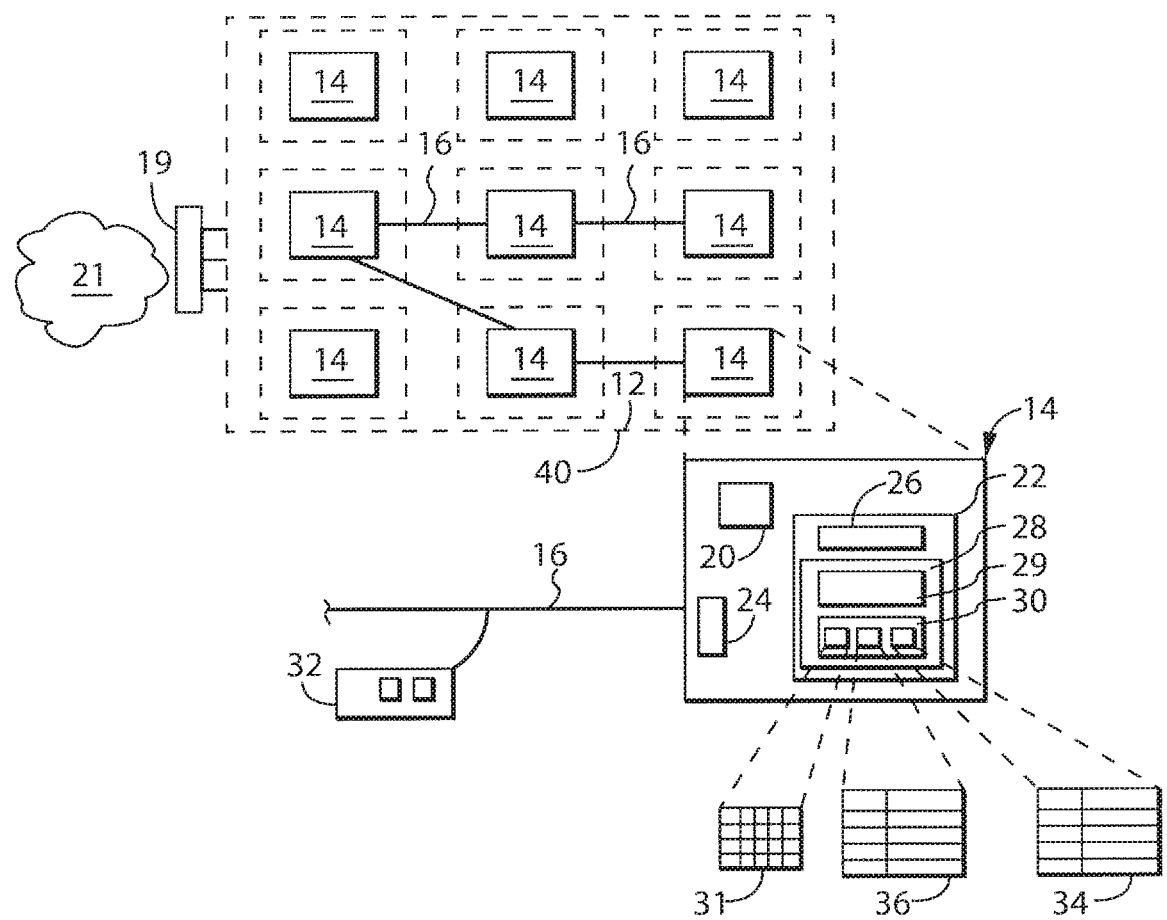
FIG. 1 is a simplified representation of an array of computers interconnected by switches, for example, in a cloud-based processing network such as may provide a set of virtual machines organized in enterprises, each virtual machine providing a virtual processor and memory as managed by a cloud application in real time.

Referring now to FIG. 1, a cloud-computing facility 10 may provide for a set of server racks 12 each holding multiple electronic computers 14 intercommunicating on a network 16. The network 16, for example, may be managed by network switches 18 represented here as an intervening matrix in dotted lines. The network switches 18 may connect with one or more routers 19 to an external network such as the Internet 21 or the like. Generally, the cloud computer facility may, for example, provide "Infrastructure as a Service" (Iaas) functionality.

As is understood in the art, each of the electronic computers 14 may provide a processor 20 having one or more cores, a memory system 22 including RAM and disk or other memory, and a network card 24 for interconnecting to the network 16. The memory system 22 may include an operating system 26, for example, allowing virtualization, and virtual machine software 28, for example, implementing a virtual application computer or, as shown, implementing a virtual middlebox using a middlebox program 29.

The middlebox programs 29 implemented by the virtual machine software 28 may provide network functions (NF) such as, but not limited to, an intrusion detection system (IDS), a proxy server, a wide area network (WAN) optimizer, and a load balancer. Generally each virtual middlebox will be on a separate virtual electronic computer appearing as if it has its own processor 20 and dedicated memory system 22 by virtue of a virtualizing operating system such as a hypervisor.

As is generally understood in the art, a WAN optimizer middlebox may implement a variety of optimization techniques to increase data transmission efficiencies over the network to the electronic computers 14, for example, by eliminating redundant data transfer, compression of data, caching and the like. An IDS middlebox may monitor traffic flowing over the network to detect malware or network intrusions or the like. A load balancer middlebox may distribute requests by users to the various application machines while preserving consistent communication threads with any given user. A proxy server may fetch web objects on behalf of web clients and cache these objects to serve later web requests. In order to operate, an IDS may generate a state extracted from multiple packets of the given flow, for example, to create a signature and to compare that signature against a whitelist or blacklist. Other middlebox functions such as proxy servers, WAN optimizers, and load balancers, extract states from flows of packets in order to associate new packets with a given flow and, for example, destination.

The middlebox program 29 may include a redistribution portion 30 used for the redistribution (creation, destruction, duplication, and transfer) of middlebox function according to the techniques in the above described patent application. In this regard, the redistribution portion 30 may receive a middlebox redistribution statement 32 implemented by a standard application programmer interface (API) recognized by the redistribution portion. The redistribution portion operates to implement a portion of the redistribution in a manner described in the above referenced '492 patent allowing seamless redistribution of middlebox functionality.

In this regard, the redistribution statement 32 may contain information about the type of redistribution (creation, destruction, duplication, and transfer) as well as a flow-space implicated in the redistribution and identification of a middlebox function implicated in the redistribution. The redistribution portion 30 responds to flow-space information and middlebox function in the redistribution statement 32 information using flow-space table 34 identifying state variables of the middlebox program 29 with respect to different flow-spaces and a middlebox function table 36 identifying state variables of the middlebox program 29 with respect to different output functions of the program associated with the state variables. In addition the redistribution portion 30 may respond to the redistribution statement 32 (especially when it indicates the creation or updating of a backup) using taint table 37 which identifies whether the state variables of the middlebox program 29 have been updated since a previous event, for example, a time or previous transfer of state data. In response to the redistribution statement 32, the redistribution portion 30 will output state data that can be used according to the above described patent application to flexibly change the configuration of virtual middlebox programs in a cloud architecture.

Figure 2:
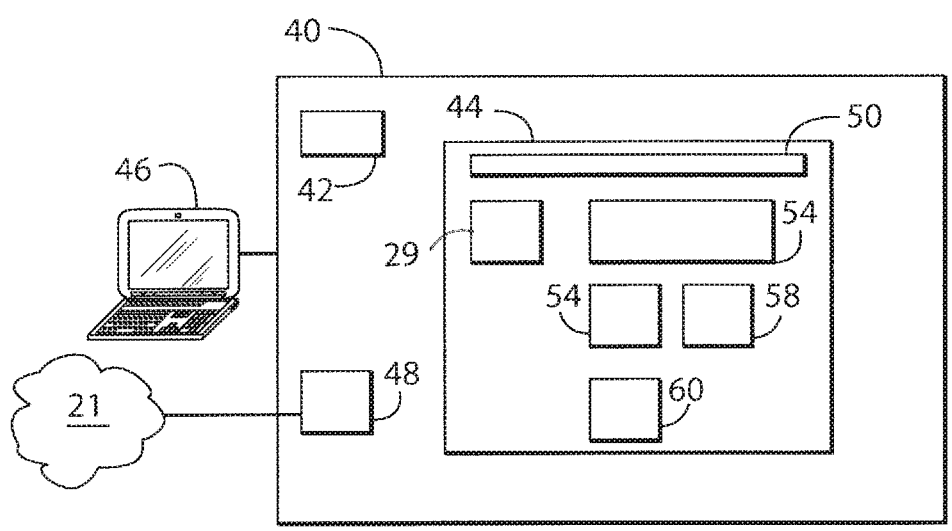
FIG. 2 is a block diagram of an electronic computer that can receive a middlebox program and execute the state identification process of the present invention for identifying state of that middlebox program.

Referring now also to FIG. 2, generation of state data needed for the middlebox program 29 and necessary for redistribution may be performed on an automatic basis using an electronic computer 40. Such a computer 40 as is understood in the art may have a processor 42 communicating with a memory system 44 and with standard peripherals such as a user terminal 46 for accepting user commands and providing outputs to a user, and a network circuit 48 providing communication with the internet 21 or equivalent network, removable media, or the like.

The memory system 44 may contain operating system 50 as well as an unprocessed middlebox program 29 that will eventually be incorporated with the redistribution portion 30 described above for implementation by virtual machine software 28. For this purpose, the operating system 50 may execute a state analyzer program 54 that identifies state variables of the middlebox program 29 and that associates identified state variables or portions of those variables with different flow-spaces and middlebox function to create the flow-space function 34 and middlebox function table 36. For this purpose, the state analyzer program 54 uses a number of data tables including a standard flow-space variable name table 56, a standard packet processing library name table 58, and a standard middlebox function table 60 as will be discussed below.

Figure 3:
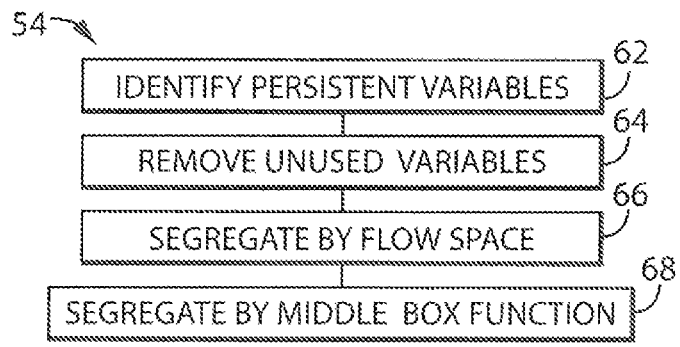
FIG. 3 is a top-level flowchart of the state identification process of the present invention providing steps of identification of persistent variables, winnowing of those variables to remove unmodified variables, segregating variables by flow-space and segregating variables by middlebox function.

Referring now to FIG. 3, the state analyzer program 54 can be broken into four primary execution steps each of will be discussed in more detail below. The first execution step, indicated by process block 62, identifies a packet processing loop that is invoked for the receipt of each packet by the middlebox program 29 and that operates to forward the packet and/or information about the packet to necessary processing code in other portions of the middlebox program 29.

The packet processing loop is used as a key to identify with other portions of the middlebox program 29 having connections to the packet processing loop which in turn will identify variables that can be persistent between executions of the packet processing loop and thus which can represent state variables. This focus on persistence between executions of the packet processing loop reflects the basic insight that only information derived from a given packet that is persistent to affect future packets can properly be considered state data of the type necessary to transfer for the processing of future packets by a new middlebox.

At a next step indicated by process block 64, this set of variables is winnowed to remove those variables, for example, that are read-only variables and thus, while persistent, are not used for the storage of state data.

At succeeding process block 66, the program 54 links the remaining variables to particular flow-space keys denoting particular flow spaces. The flow space keys identify variables or portions of variables (for example fields) that relate to a given flow space allowing a function to be developed that receives a flow space and by using the appropriate flow space key, identifies top-level variables or portions of those variables that are relevant to the flow space. An example flow space might be a range of source addresses of received packets. In this case, the flow space key might identify a field, for example, in a "black list" table of packet source addresses identifying the black list rules (e.g. block, route, log) to numeric ranges of packet source addresses. The function would then take a flow space denoted, for example, by a range of source addresses and review those fields indicated by the flow space key to identify rows of the black list table relevant to that flow space. Those identified rows would then be transmitted in their entirety in response to the request designating a range of IP source addresses. This developed flow space function allows the middle box to filter state information that is needed and not needed for particular packet processing tasks required of a new middle box instance.

At succeeding block 68, a similar association of the state data is performed with respect to the function of the middlebox using that state data. Generally some state variables will be used for logging purposes and some state variables will be used for control of packet processing, for example, routing or blocking of packets.

When only consistency in the output of this latter function is required in the new middlebox, for example, state data only associated with this function is transmitted in the redistribution, saving network bandwidth and speeding the redistribution process. This information relating state data to middlebox function is ultimately enrolled in middlebox function table 36.

Different functions can have overlap in the set of variable associated with them.

Figure 4:
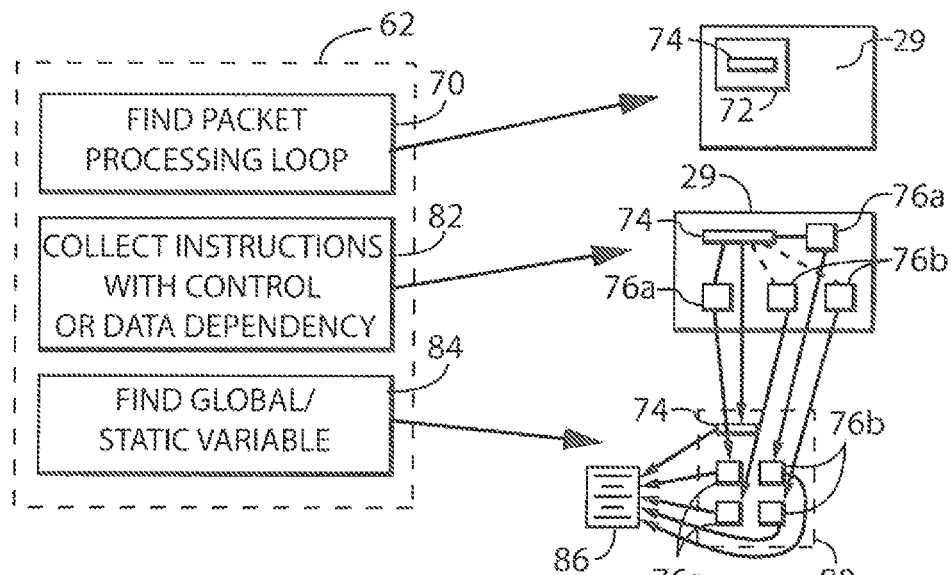
FIG. 4 is a detailed flowchart of the first step of FIG. 3 showing identification of persistent variables representing top-level variables.

Referring now also to FIG. 4, this first process block 62 which identifies a set of possible state variable values (termed top-level values) may begin as indicated by process block 70 by reviewing the packet processing library name table 58 to identify the name of standard packet reading/writing libraries holding a packet processing loop. These standard packet reading/writing libraries will identify within the middlebox program 29 statements associated with a middlebox procedure 72 holding a packet processing loop 74. For example, identified packet-reading calls (system calls or library functions) in the standard packet reading/writing libraries may be used to identify the packet processing loop 74. Example standard libraries for packet processing include: "pcap_next", or "recv". A packet processing loop 74 is a set of statements that repeatedly loops to: (1) check for the existence of a new packet received by the middlebox program 29; and (2) pass the received packet to packet processing routines for processing according to the middlebox function. Precise identification of the packet reading calls for each of the standard reading/writing libraries, used to identify the packet processing loop 74, may also be enrolled in the packet processing library name table 58.

Generally the middlebox procedure 72 includes initialization and configuration code that may be distinguished from the code of the packet processing loop 74.

Once the packet processing loop 74 is identified, additional procedures called or dependent on the packet processing loop 74 are also identified. These procedures can generate variable values dependent on a current processed packet that can persist to affect the next processed packet. The first identified procedures are "called-procedures" 76a that are called by the packet processing loop 74 directly or indirectly (e.g., via a previously called procedure) and "data-dependent procedure" 76b where there is a data dependency between variables of the packet processing loop and the called-procedure 76a without direct control flow. Data dependency, for example, can occur without a call when data is enqueued for later processing.

The called-procedures 76a and the data-dependent procedure 76b may be determined by preparing a system dependence graph consisting of multiple program dependence graphs for each procedure. Each program dependence graph has vertices for each statement along with the data and control dependency edges. A data dependency edge is created between statements if there is an execution path between them and one statement may update a value which the other statement reads. A control dependency edge is created if one statement is a conditional statement determining whether or not the other statement executes. This technique is described in S. Horwitz, T. Reps, and D. Binkley, "Interprocedural slicing using dependence graphs", PLDI '88, Proceedings of the ACM SIGPLAN 1988 conference on Programming language design and implementation, Pages 35-46, ACM, New York, NY Using the system dependence graph, a forward program slice is computed for the variable which stores the received packet at the packet processing loop 74. All procedures associated with the statements in the slice are collected in a state procedures group 80 per process block 82.

At process block 84, the state procedures group 80 is then analyzed to identify all global and static variables that are used or accessed within the state procedures group 80 to provide a top-level variable group 86. To this group of identified variables are added local variables of the middlebox procedure 72 which are also persistent outside of the packet processing loop 74. Together these variables provide a top-level variable group 86 which represents a superset of state variables.

Figure 5:
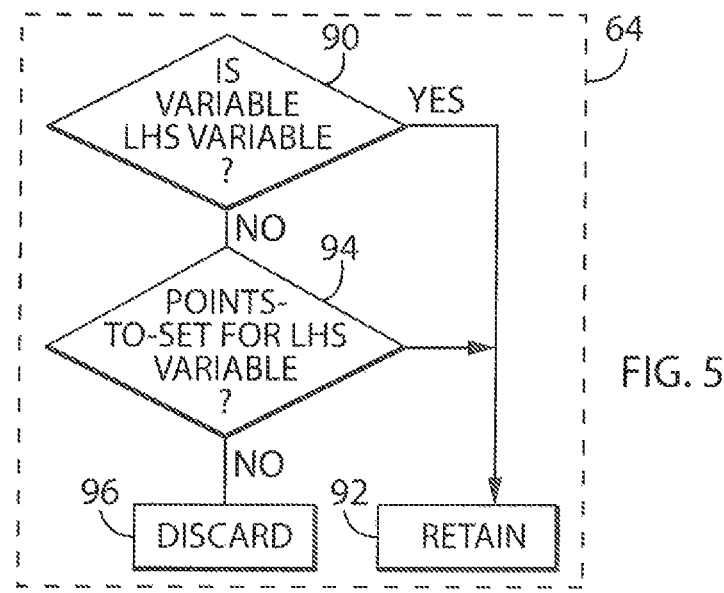
FIG. 5 is a figure similar to FIG. 4 showing a detailed flowchart of the second step of FIG. 3.

Referring now to FIGS. 3 and 5, the variables of the top-level variable group 86 are then analyzed statically to see if they are in fact modified and thus could actually store dynamic state. At decision block 90 each variable of the top-level variable group 86 is analyzed to see it if it is on the left-hand side of an assignment statement within at least one of the procedures in state procedures group 80 such as would indicate the possibility that its value could be modified. If so, it is retained in the top-level variable group 86 as indicated by process block 92. If not, at decision block 94 a "points-to-set" of variables is established for the particular variable being analyzed. A variable's "points-to-set" contains all the variables whose associated storage locations are reachable from the variable being analyzed and thus addresses the fact that some variables have multiple effective names. If at decision block 94 there is no "points-to-set variable" for the variable being analyzed on the left-hand side of an assignment statement (that is, if the intersection of the "points-to-set" of the variables on the left-hand side of an assignment statement and the "points-to-set" of the top level variables is empty) within at least one of the procedures in state procedures group 80 then that variable being analyzed is discarded (removed from the top-level variable group 86) as indicated by process block 96. Otherwise the variable being analyzed is retained in the top-level variable group 86 per process block 92.

Referring now to FIGS. 1, 2 and 6, the operation of process block 66 of FIG. 3 which associates state data with flow-space, as indicated by process block 100, begins by identifying variable names used to identify particular packet fields (packet header field (PHF) variables), for example, such as hold different portions of the received packet as received by the packet processing loop. These packet header field variable names may be pre-stored in the packet processing library name table 58 and are identified to different flow-spaces, for example, the flow-space of the packet source IP address, the packet destination IP address, the packet source input port, the packet destination output port and the packet protocol. Standard packet field names include for example: src_ip, dest_ip, src_port, dest_port, and proto.

Once these PHF variables have been identified, the top-level variable group 86 is reviewed at process block 102 to find data structures that represent a mechanism used to steer packet processing to particular portions of the program based on those fields. Only those structures or pointers in statements that accept as arguments PHF variables are considered. Such data structures may be a hash table or linked list. For each such identified structure, a "chop" of the program 54 is computed between the packet received function and a point where the value of each PHF variable is accessed within the state procedures group 80 (shown in FIG. 4) to provide a set of statements invoked in the processing of each PHF variable. This is shown by process block 104.

These statements are then reviewed to segregate the top-level variables according to PHF variable per process block 106. In this way distinct sets of state variables maybe identified to each flow-space associated with a packet field name.

The flow-state function 34 may then be created that operates with index linking in rows standardized flow-space keys (in a first column) and related to a particular flow space, to state variables or portions of state variables (for example fields related to the PHF variable names) (listed in a second column) that relate to a flow space of the flow space key. As discussed above with respect to FIG. 1, this allows the redistribution statement 32 to designate a particular flow-space (by a standardized flow-space name). The flows-state function 34 then identifies the flow space key and the state variables or portions of the state variables to search those state variables or portions of state variables for values related to that flow space.

Referring now to FIGS. 1 and 7, an additional but similar analysis may be performed on the top-level variables to associate them with middlebox output function to create output function table 36 so that the redistribution statement 32 may request only state data relevant to a particular middlebox output function when the consistency requirements on middlebox output will be limited. In one example the middlebox output functions may include logging information about the packets (that is, recording the operation of the middlebox) and active control of packet processing such as routing, filtering or the like. This segregation is performed as indicated at process block 108 by first identifying standard libraries associated with these different functions such as provide outputs from packet processing. In this regard, the middlebox function table 60 (shown in FIG. 2) may be used to identify standard names for these programs to identify the relevant code sections for different standard middlebox functions.

At process block 110, a slice of program 54 is computed backward from each output call site (where the output routine is called) and the top-level variables found in that slice identified per process block 112. These variables may be used to populate output function table 36 (in a second column) linked by rows to the identified middlebox output functions (in a first column) determined at process block 108. Using this function table 36, the redistribution statement 32 may designate a subset of the state variables associated with a particular middlebox output function (for example, all output functions other than logging) to greatly reduce the bandwidth of transmitted state data.

Referring now to FIGS. 1 and 8, the present invention's ability to accurately identify state variables and to reduce the number of such variables permits the middlebox to also provide a "taint analysis" during middlebox operation. This taint analysis monitors state data to identify state data that has changed since the last transmission of the state data so that only the change to state data need be transmitted. In the case of generating a new update of a backup or redundant middlebox, this taint analysis can greatly reduce the amount of state data that needs to be transmitted repetitively at each update interval. For the purpose of discussion herein, the updating of a redundant middlebox will be considered a redistribution creating a new middlebox that is updated.

This taint analysis is performed by the redistribution portion 30 having received state data extracted as described above and simply instruments the middlebox program 29 to set a bit in a taint table 114 associated with each state variable when that state variable is modified. When state data is transmitted each of these bits is reset.

The amount of instrumentation code needed to update the taint table 114 may be reduced by identifying state data that will be updated at the same time (on a single control path) so that a single instrumentation statement can provide an updating that updates multiple bits in the taint table 114. Such opportunities for multiple updates using a single statement can be assessed by creating a control flow graph of a fully instrumented middlebox program 54 (e.g., having an instrumentation statement for each bit in the taint table 114). Starting from the bottom of the graph (depth-first) the bits that have updating instrumentation statements are tracked. When a new updating instrumentation statement is arrived at, if every incoming edge has previously updated that state bit, this updating statement may be pruned.

Referring now to FIG. 1 and when a redistribution statement 32 is received by the middlebox program 29, as indicated by process block 116, the redistribution portion 30 determines whether there is a flow-space specified by the redistribution statement 32 at decision block 118. If not, at decision block 120, the redistribution statement 32 is checked to see whether it has a middlebox function "output" specified. If not, at next process block 122 determination is made as to whether the middlebox state has previously been requested as part of a regular updating of a backup middlebox and thus can be winnowed by the taint table 114. If not, identified state variables are provided in response to the redistribution statement 32 as indicated by process block 124.

If at any of these decision blocks 118, 120, and 122 the redistribution statement 32 includes a qualification of the state, the intersection of a subset of the states identified by decision blocks 118, 120, and 122 is determined at process block 126 and only this common state data is returned for instantiating or updating a new middlebox.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a machine" and "a virtual machine" or "a computer" and "a processor," can be understood to include one or more virtual machines or underlying processors that can communicate in a stand-alone and/or a distributed environment(s), and can thus be configured to communicate via wired or wireless communications with other processors, where such one or more processor can be configured to operate on one or more processor-controlled devices that can be similar or different devices. The term virtual machine should be understood broadly to include virtual containers and the like which provide alternative methods of virtualization. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A method of extracting state variables from a middlebox program of a type used in a cloud computing architecture implementing virtual machines, the cloud computing architecture further being controlled by a cloud application that dynamically allocates virtual machines to different enterprises and monitors costs of the virtual machines against an account for each enterprise, the virtual machines including application virtual machines executing application programs to implement an application for the enterprise and middlebox virtual machines executing middlebox programs enforcing rules related to a transport of data between application virtual machines, the method comprising the steps of executing a program on an electronic computer to:
(a) receive a middlebox program separate from the program executed on the electronic computer;
(b) analyze the middlebox program by reviewing instructions of the middlebox program to identify, in the middlebox program, a set of top-level variables including state variables by selecting, through this analysis, variables of the middlebox program that are persistent in the middlebox program after a packet processing loop, the packet processing loop executing for each packet received by the middlebox program, where the top-level variables are modified by a first given loop of the packet processing loop receiving a first packet and persistent during a second subsequent given loop of the packet processing loop receiving a second packet; and
(c) use the analysis of (b) to generate a program portion interacting with the middlebox program as received to provide the identified top-level variables in response to a request to the middlebox program for state data affecting the transport of future data during use of the given middlebox program in a cloud computing architecture;
wherein the packet processing loop is identified using a standard library name of a library providing a packet processing loop.

2. The method of claim 1 wherein step (b) identifies the top-level variables by identifying control-flow-linked statements called directly or indirectly, by the packet processing loop.

3. The method of claim 2 wherein step (b) further identifies top-level variables by identifying data-dependency-linked statements having a data dependency with variables of the control-flow-linked statements.

4. The method of claim 3 wherein the data-dependency-linked statements include statements having a data dependency with an alias of variables of the control-flow-linked statements.

5. The method of claim 4 wherein step (b) wherein the top-level variables include data-dependency-linked variables and control-flow-linked variables only if they are subject to modification by statements.

6. The method of claim 4 wherein step (b) wherein the top-level variables further include loop-procedure variables used by statements within a packet processing procedure holding the packet processing loop, the packet processing procedure further configuring and initializing the packet processing loop.

7. The method of claim 3 wherein step (b) wherein top-level variables are selected from static and global variables accessed by the data-dependency-linked statements and control-flow-linked statements.

8. The method of claim 1 further including the step of establishing a function receiving a flow space identifier and identifying top-level variables or portions of top-level variables associated with a flow space of the flow space identifier; and
wherein step (c) generates statements interacting with the middlebox program to provide the top-level variables or portions of the top level variables associated with a given flow space in response to the request to the middlebox program for state data of the given flow-space during use of the middlebox program in a cloud computing architecture for top-level variables associated with the given flow-space.

9. The method of claim 8 wherein the function identifies flow-space related statements associated with variables holding parameters of packets defining a flow-space to identify top-level variables or portions of top-level variables associated a flow space of the flow space related statements.

10. The method of claim 9 wherein the flow-space is selected from the group consisting of packet source address, packet destination address, packet source port, and packet destination port or a range of such addresses or ports.

11. The method of claim 1 further including the step of associating the top-level variables to middlebox output functions of the middlebox program; and wherein step (c) generates statements interacting with the middlebox program to provide the top-level variables, in response to the request to the middlebox program for state data of a middlebox output function during use of the middlebox program in a cloud computing architecture, to provide for top-level variables associated with the middlebox output function.

12. The method of claim 11 wherein the middlebox output functions are selected from the group consisting of packet control and middlebox function logging.

\* \* \* \* \*